July 10, 1956 M. T. HEDQUIST ET AL 2,753,783
TRACTOR HITCHED PLOW
Original Filed July 19, 1944 2 Sheets-Sheet 1

Inventor
MILTON T. HEDQUIST
DAVID D. MAYHEW
ACHEIL VAN DESAMPEL
ARTHUR J. WHALEN
By Emerson B Donnell
Attorney

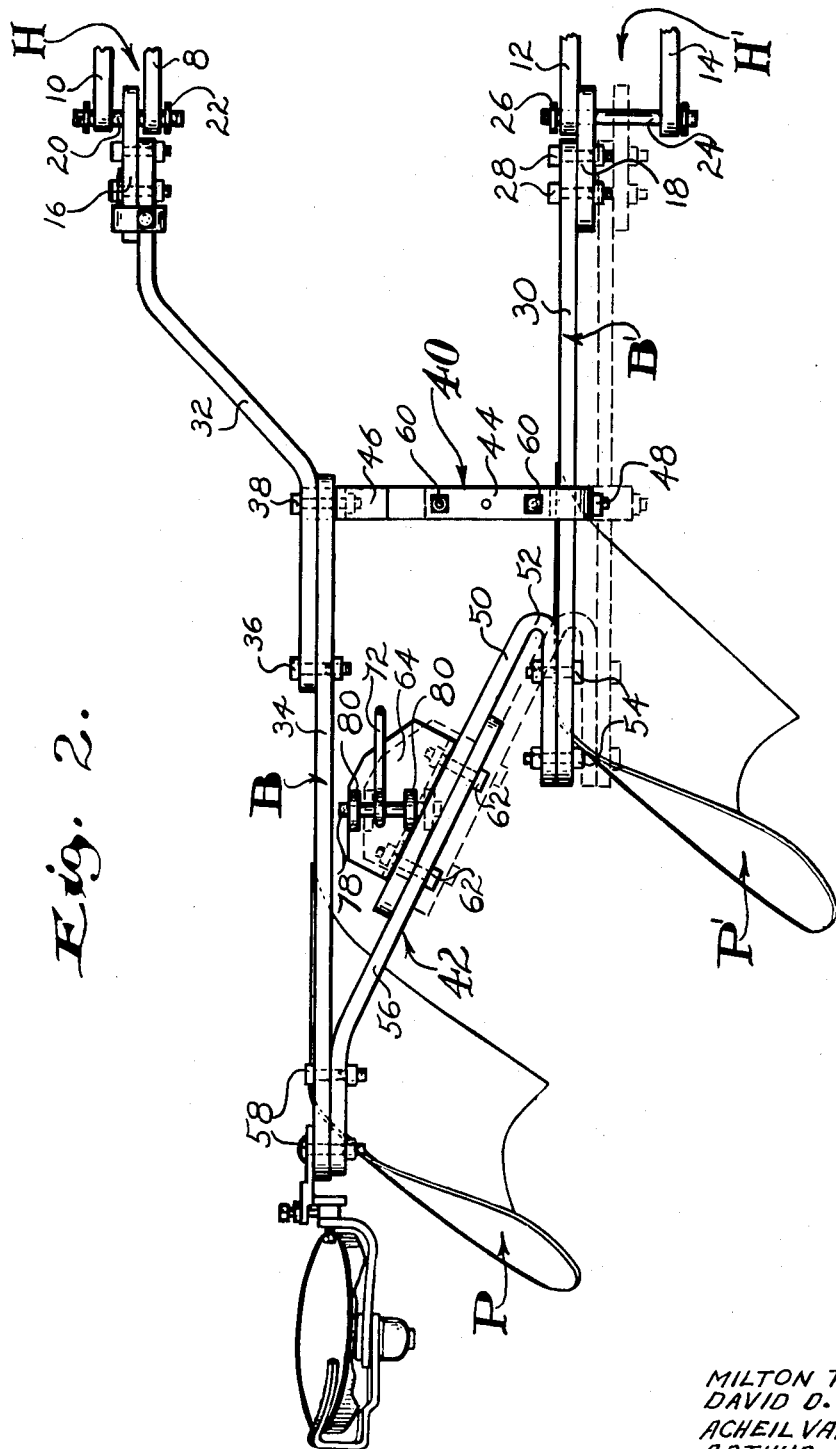

United States Patent Office 2,753,783
Patented July 10, 1956

2,753,783

TRACTOR HITCHED PLOW

Milton T. Hedquist, David D. Mayhew, Achiel Van De Sampel, and Arthur J. Whalen, Rock Island, Ill., assignors to J. I. Case Company, Racine, Wis., a corporation of Wisconsin Original application July 19, 1944, Serial No. 545,648, now Patent No. 2,618,212, dated November 18, 1952. Divided and this application November 7, 1952, Serial No. 324,533

2 Claims. (Cl. 97—47.2)

This invention relates to a tractor hitched plow and especially to the means for adjusting the plow frame. This application is a division of the application of Hedquist et al., Serial No. 545,648, filed July 19, 1944, and issued November 18, 1952, as U. S. Patent No. 2,618,212, which discloses features that are illustrated, but not otherwise described in this application.

An object of the invention is to provide a plow frame which can be easily adjusted to accommodate various sizes of plow bottoms.

Further objects and advantages of the invention will be apparent from the following description and drawing wherein:

Fig. 2 is a plan view showing the plows, the plow beams therefor, their braces, portions of their hitches, and indicating in broken lines a rearrangement of the parts constituting the invention.

Figure 1:
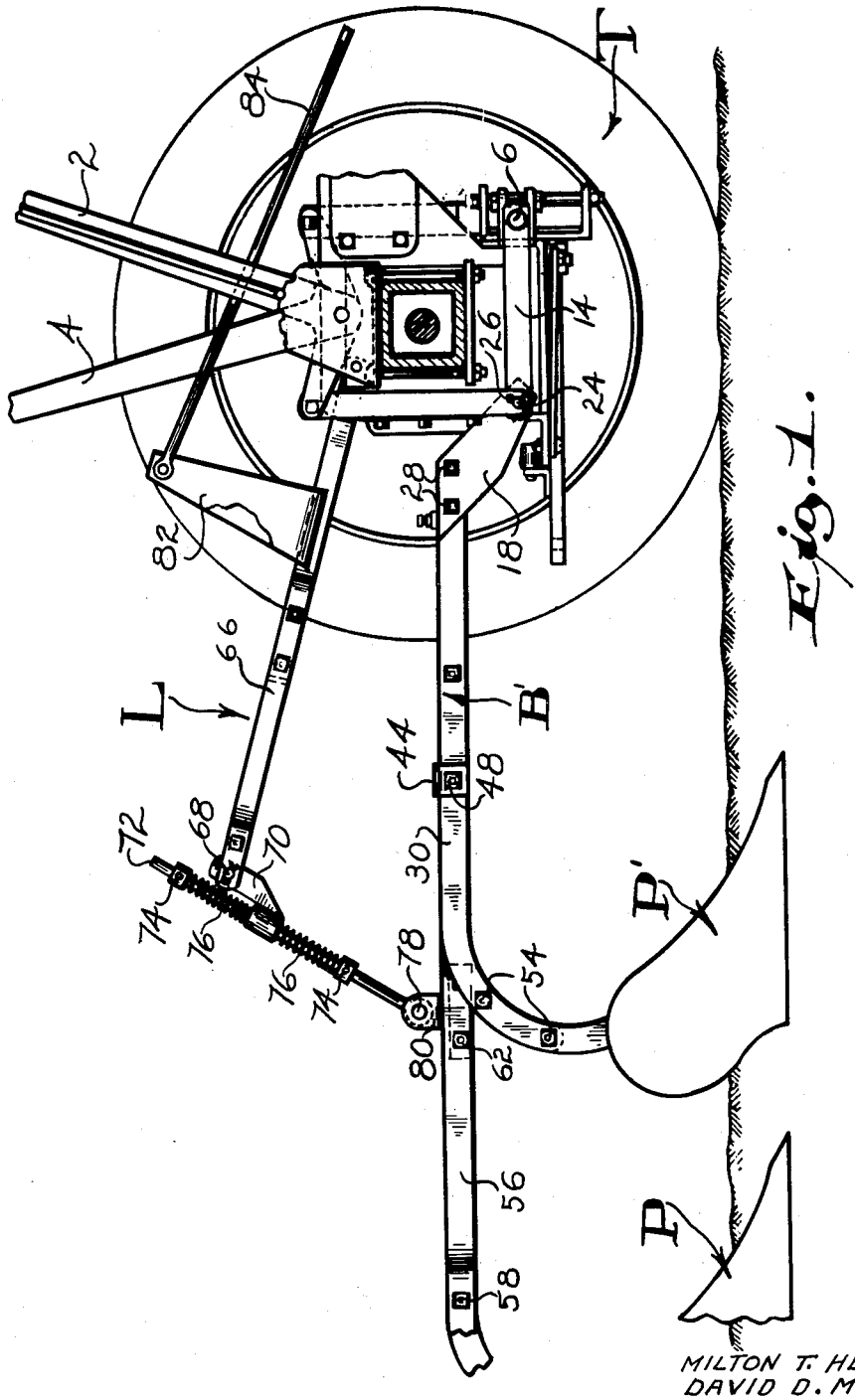
Fig. 1 is a side view, partly in vertical longitudinal cross section to better illustrate the device embodying the invention.

Referring to the drawings, it will be seen that the device comprises in general the plows designated generally at P and P' trailing a tractor. The plows P and P' are attached to the plow beams designated generally at B and B'. The plow beams B and B' are connected, by hitches or draw bar connections designated generally at H and H', to the tractor; these hitches being so constructed and organized as to apply the draft to the plows and also to provide for leveling, tilting and lifting thereof.

The levers 2 and 4 and other associated parts (see Fig. 1) are included in the leveling and tilting mechanism which forms no part of the present invention and which is fully explained in the above-mentioned Hedquist et al. patent, No. 2,618,212.

The hitches H and H' are secured to the shaft 6 which is attached to the tractor T in the manner described in the above-mentioned patent. The shaft 6 is attached to the tractor in a plane transverse to the direction of travel of the tractor, its only purpose in the present invention being to apply draft to the implement.

While the hitches H and H' are of similar construction they differ in their particular design in order to adapt them to perform their respectively different adjustments. They have, of course, in common the duty or function of applying the draft to their respective plow means.

Each of these hitches is of double barred construction for purposes of ruggedness and strength. The hitch H has a bar 8 whose forward end is rigidly attached to the shaft 6. The other element of the hitch H comprises a straight bar 10 securely bolted to the bar 8. Similarly, the hitch H' comprises a pair of bars 12 and 14, each of which is straight and each of which has its forward end welded or otherwise suitably secured to its projecting end of the shaft 6. The bars 12 and 14 are parallel and are arranged in transversely spaced relation; in fact, their spacing is somewhat greater than the spacing of the spaced portions of the bars 8 and 10 of the hitch H as shown in Fig. 2.

Connections are supplied between the rearward ends of the hitches H and H' and their respective plow beams B and B'. Both such connections comprise metal plates, the metal plate interconnecting the hitch H and the plow beam B being designated generally at 16 (see Fig. 2) and the metal plate interconnecting the hitch H' and the plow beam B' being designated generally at 18. The plates 16 and 18 are pivotally interconnected with the hitches, this pivotal interconnection being accomplished in the instance of the plate 16 with its hitch H by means of a comparatively short pivot pin 20 (see Fig. 2), cotter pins and washers 22 being provided to prevent axial displacement of the pivot pin 20. A similar though longer pivot pin 24, equipped with suitable cotter pins and washers 26 pivotally interconnects the plate 18 with the hitch H'.

The plate 18 has its upper and rearward end secured by bolts 28 to its plow beam B' as clearly illustrated in Fig. 1. The plate 16 is attached to its plow beam B in a similar manner, but includes an adjusting feature which does not form part of the present invention, (see Fig. 2).

The plow beam structures B and B' are also similar in nature in that both are constructed of strap iron of suitable gage, the bar of the plow beam B' being designated at 30 and the bar structure of the plow beam B, which is composite, being inclusive of two bars 32 and 34 (see Fig. 2). The bars 32 and 34 are bolted together as indicated at 36 and 38.

The plow beams B and B' are cross braced and this in a special manner. The desired bracing is accomplished by two braces, one designated generally at 40 and the other at 42. The brace 40 comprises two metal strips 44 and 46 having their ends lugged and secured to the plow beams B and B' as shown in Fig. 2. One of the strips 46 is attached to its plow beam B by the bolt and nut 38 which takes part in securing the bars of the plow beam B together. The other strip 44 is secured to the plow beam B' by a separate bolt and nut 48.

The brace 42 is diagonally arranged. It is also constructed of strap iron and includes a strip 50 having a V-shaped end 52 secured by bolts and nuts 54 to the plow beam B'. The other strip 56 of the brace 42 has its rearward end secured by bolts and nuts 58 to the plow beam B. In both instances the metal strips which constitute the braces may be adjusted with respect to each other, and may be fixed in the desired adjustment by suitable bolts and nuts cooperable with a series of bolt holes provided in the strips and adapted to be brought into suitable registry. In the instance of the brace 40 the bolts and nuts for maintaining the desired adjustment are designated at 60. In the instance of the brace 42 corresponding bolts and nuts are designated at 62.

The advantage of the invention is that the spacing of the plow beams may be adjusted when required. For example, when it is desired to use plows of a larger size than those shown, it is necessary to space the beams a greater distance apart. This may be accomplished as illustrated in broken lines on Fig. 2 by reversing the relation on the strips of the brace 42 to each other and adjusting the length of brace 40, and which is accomplished in the following manner. The bolts and nuts 60 in brace 40 are removed and the bolts and nuts 62 and 54 of brace 42 are removed. The brace 42 is adjusted by placing strip 50 on the opposite side of strip 56, from that shown in full lines to that shown in broken lines in Fig. 2, and bringing into registry the proper holes in the two strips 50 and 56. The bracket 64 is then brought into contact with strip 56, and holes in bracket 64 and strips 56 and 50 are aligned, and the bolts and nuts 62 are used to secure the three pieces into a rigid brace. The bolts and nuts 54 are then replaced to secure the brace 42 to the plow beam B'. The brace 40 is adjusted lengthwise to accommodate this increased space between the plow beams B and B', the holes in strips 44 and 46 being brought into alignment and the bolts and nuts 60 replaced to secure the brace 40. It will be noted that the greater spaced relation between the elements 12 and 14 of hitch H' to that between the elements 10 and 8 of hitch H is now utilized to accommodate the adjusted position of the plow beams B and B'.

Also combined with the plow beam structure is a lifting mechanism designated generally at L. This mechanism is largely of a conventional construction. It includes a yoke 66 constructed of strap iron and converging to pivotally interconnect as at 68 with a sliding connection 70 interfitted with a supporting rod 72, having collars 74 pinned thereto and having springs 76 interposed between the collars 74 and the sliding connection 70 as seen in Fig. 1. The lower end of the rod 72 is pivotally interconnected with a pivot pin 78 mounted in ears 80, fixed to a bracket 64 attached to the brace 42 by the same bolts 62 for securing the strips of the brace 42 together, see Fig. 2.

The lift mechanism is usually power operated, but as the power means for operating it forms no part of the present invention, it is not necessary to illustrate or describe it. It is sufficient to indicate that bracket 82 may be attached to the yoke 66 and connected by a suitable rod 84 to the power operating mechanism not shown.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What we claim is:

1. A tractor hitched plow comprising bar-like hitches supported on and drawn by the trailing end of the tractor, and extending rearwardly therefrom, plow beams pivoted to and extending rearwardly from the respective hitches, plows carried by said beams, an adjustable and detachable transverse brace between the forward portions of the plow beams, and an adjustable, detachable and diagonally disposed, two part brace between the rear portions of the plow beam, the parts of said brace being reversible in their relation to each other to provide for variation in the transverse spacing of the plow beams to accommodate plows of different sizes.

2. A frame construction for a two-bottom plow comprising in combination a pair of spaced-apart plow beams, a transverse brace diagonally disposed between said beams adapted to maintain them in a relation spaced a predetermined amount from each other, said brace comprising two individual bar sections of substantial thickness, disengageable means securing them together intermediate the ends of said brace in overlapped relation, said bar sections being proportioned for overlapping engagement in reversed relation relative to each other so as to vary the dimensions of said brace laterally to secure said plow beams in a second predetermined spaced relation different from the first-mentioned predetermined spaced relation, and said disengageable means being adapted to secure said bar sections together in said reversed overlapped relation.

References Cited in the file of this patent

UNITED STATES PATENTS

| | | |
|---|---|---|
| 2,139,042 | Silver | Dec. 6, 1938 |
| 2,179,526 | Strandlund | Nov. 14, 1939 |
| 2,438,625 | Strandlund | Mar. 30, 1948 |
| 2,618,212 | Hedquist et al. | Nov. 18, 1952 |